United States Patent [19]

Iwafune et al.

[11] 4,277,171
[45] Jul. 7, 1981

[54] BASE BOARD DEVICE FOR MEASURING INSTRUMENTS

[75] Inventors: Yasuo Iwafune; Hideo Iwai, both of Tokyo, Japan

[73] Assignee: Tokyo Kogaku Kakai Kabushiki Kaisha, Tokyo, Japan

[21] Appl. No.: 43,039

[22] Filed: May 29, 1979

[30] Foreign Application Priority Data

May 31, 1978 [JP] Japan .................. 53-65187

[51] Int. Cl.³ .................... G01B 11/27; G02B 27/32
[52] U.S. Cl. ..................................... 356/153; 356/255
[58] Field of Search .................... 356/247–255, 356/399–401, 153, 138; 33/292, 299

[56] References Cited

U.S. PATENT DOCUMENTS

| 197,369 | 11/1877 | Hoffman | 33/299 |
| 202,916 | 4/1878 | Young | 33/299 |
| 1,827,135 | 10/1931 | Blake | 356/254 |
| 2,166,101 | 7/1939 | Möller | 350/81 |
| 2,696,052 | 12/1954 | Czarnikow | 350/11 |

FOREIGN PATENT DOCUMENTS 548685 4/1932 Fed. Rep. of Germany ........... 356/249

OTHER PUBLICATIONS

Osterholzer, E. J., "Apparatus For Electrically Connecting A Probe With An Integrated Circuit", Western Electric Tech. Dig. #26, 4-1972, pp. 45-50.

Primary Examiner—William H. Punter
Attorney, Agent, or Firm—Stevens, Davis, Miller & Mosher

[57] ABSTRACT

A base board device for detachably mounting a measuring instrument such as a transit. The base board device has a centering telescope for locating the base board directly above a point on the ground. The centering telescope has a mark in the eyepiece which defines a viewing axis directed vertically downwardly. In order to determine whether or not the viewing axis as defined by the mark is directed accurately downwardly, the centering telescope is used. To facilitate that use, the base board is formed at the center thereof with an aperture so as to make it possible to observe the vertically downward point through the centering telescope.

5 Claims, 4 Drawing Figures

BASE BOARD DEVICE FOR MEASURING INSTRUMENTS

The present invention relates to a base board device for measuring instruments and more particularly to a base board device having a centering telescope.

In a measuring instrument such as a transit or an electro-optical distancemeter, it is required to have the instrument fixed vertically above a mark provided on the ground. For the purpose, the instrument is generally mounted on a base board at an accurate position. When the measuring instrument has a centering telescope for viewing vertically downwards, it is possible to locate a predetermined position of the base board vertically above the mark on the ground by using that centering telescope. However, since there are many measuring instruments which do not have such a centering telescope, the base board itself may also be equipped with a centering telescope.

In general, such centering telescope is so designed that the viewing axis is accurately determined by adjusting a mark in the eyepiece. However, even after such adjustment, the viewing axis may gradually become inaccurate through a prolonged use. Sometimes, the eyepiece of the centering telescope may hit other objects in use and, as a result, the mark may be moved from the adjusted position. Thus, it is advisable to check the accuracy of the viewing axis on site.

Hithertofore, in order to check the accuracy of the viewing axis, a suspended weight has been used. More specifically, such weight is suspended from a predetermined position of the base board which is maintained horizontally to determine the vertically downward position on the ground and the ground position is viewed by the centering telescope. However, the method is not satisfactory because it is quite difficult to keep the weight stationary when there is a wind even if the wind is very weak so that a long time is consumed in providing a mark on the ground. Further, the mark thus provided on the ground may often be inaccurate.

It is therefore an object of the present invention to provide novel means for checking the viewing axis of a centering telescope on the base board.

Another object of the present invention is to provide means for checking the viewing axis of a centering telescope which is mounted on the base board by means of a centering telescope provided on a measuring instrument.

According to the present invention, the above and other objects can be accomplished by a base board device for a measuring instrument comprising a base board having a center, a centering telescope having a viewing axis directed substantially toward the center of the base board, means provided on said base board for removably mounting a measuring instrument at a predetermined position, reflector means provided substantially at the center of the base board for reflecting the viewing axis of the centering telescope perpendicularly downwardly with respect to the base board, aperture means formed in said base board at the center thereof, said reflector means being such that it permits observing a vertically downward position of said center of the base board through said aperture means.

The reflector means may be comprised of a half-transparent mirror or prism or, alternatively, it may be located only on one side of the center of the base board. According to the present invention, it is possible to check the accuracy of the viewing axis of the centering telescope on the base board by at first mounting on the base board a mesuring instrument having a centering telescope and viewing through this centering telescope and further through the aperture means in the base board a vertically downward point on the ground, and thereafter viewing the ground point through the centering telescope on the base board. After the accuracy of the viewing axis of the centering telescope has been checked and correction has been made as necessary, the measuring instrument may be removed where necessary from the base board and the base board may be moved to a desired position.

Since the measuring instrument is generally rotatable about a vertical axis, the accuracy of the viewing axis of the centering telescope on the measuring instrument can readily be checked by performing the observations at first in one position and then after rotating the instrument by 90°C.

The above and other objects and features of the present invention will become apparent from the following descriptions of a preferred embodiment taking reference to the accompanying drawings, in which.

Figure 1:
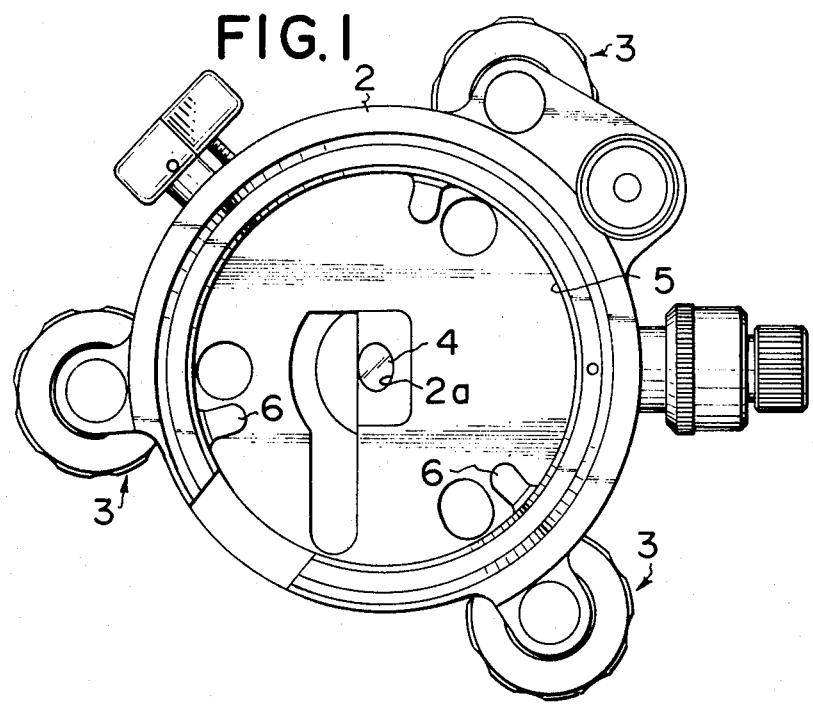
FIG. 1 is a plan view of a base board device for a measuring instrument in accordance with one embodiment of the present invention.
Figure 2:
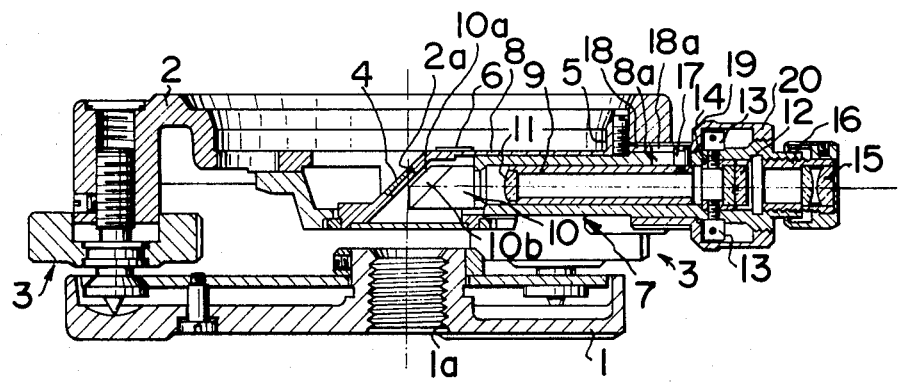
FIG. 2 is a medical sectional view of the base board shown in FIG. 1.

Referrig to the drawings, particularly to FIGS. 1 and 2, the base board device shown therein includes a lower board 1 having an internally threaded hole 1a for attachment to a base of a tripod and an upper board 2 adapted to be placed on the lower board 1. The upper board 2 is supported on the lower board 1 through three adjustable screws 3 so that the upper board 2 can be placed in a horizontal position through appropriate adjustments of the screws 3.

The upper board 2 is formed at the center thereof with an aperture 2a which is vertically aligned with the threaded hole 1a in the lower board 1. A transparent glass 4 is disposed in the aperture 2a. As shown in FIG. 2, the upper board 2 has a cylindrical recess 5 which is formed therein for mounting at an accurate position a measuring instrument such as a transit or another element such as a target or a reflecting mirror which is adapted to be used with an electro-optical distancemeter. In the recess 5, there are formed three lands 6 which define a horizontal reference plane.

The upper board carries a centering telescope 7 for viewing a point which is vertically downwards with respect to the center of the cylindrical recess 5. The telescope 7 is comprised of an outer tube 8 secured to the upper board 2 and an inner tube 9 adapted to be axially slidably received in the outer tube 8. A triangle dach-prism 10 is mounted on the tip end of the outer tube 8. the prism 10 comprises a pair of reflecting surfaces 10b which are perpendicular and intersect with each other at an edge 10a. The edge 10a in inclined with respect to the longitudinal axis of the outer tube 8 by an angle 45°. It will thus be understood that the light which passes upwardly through the threaded aperture 1a in the lower board 1 is reflected by the surfaces 10b along the axis of the outer tube 8 while being turned from one side to the other. At the tip end of the inner tube 9, there is mounted an objective lens 11.

In the vicinity of the other end of the outer tube 8, there is provided a transparent mark plate 12 having a mark such as a cross-line. The plate 12 is mounted for adjustment in the vertical and horizontal directions through four adjusting screws 13 which are located at 90° different positions. Describing in detail, the mark plate 12 is secured to a support tube 14 which is engaged with the adjusting screws 13 whereby the position of the mark plate 12 can be adjusted through actuation of the screws 13. The outer tube 8 is threadably engaged at the end adjacent to the mark plate with a lens tube 16 of an eye lens 15 so that a fine focusing can be performed through a rotation of the lens tube 16.

The outer tube 8 is formed with a longitudinally extending slot 8a which is adapted to receive a pin 17 secured at one end to the inner tube 9. The other end of the pin 17 is in engagement with a cam slot 18a formed in an adjusting tube 18 which is secured to the outside of the outer tube 8. It will thus be understood that a coarse adjustment of focus is performed through a rotation of the adjusting tube 18 to produce an axial movement of the inner tube 9.

Figure 3:
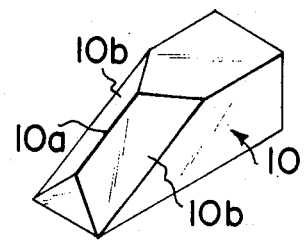
FIG. 3 is a perspective view of the reflecting prism used in the base board device shown in FIGS. 1 and 2; and, FIG. 4 is a sectional view showing the base board device in combination with a tripod and a transit.

The adjusting tube 18 is formed at the inside thereof with a flange 19 which is formed so as to encircle the adjusting screws 13, and a cover 20 is fitted to the flange 19. The mark plate 12 is therefore adjusted in position by at first removing the cover 20 and thereafter actuating the screws 13. In order to make it possible to observe a vertically downward point through the aperture 2a, the prism 10 is of such a configuration that the tip end is cut-off along a plane which is passing through the center of the upper board 2 and perpendicular to the axis of the outer tube 8 as shown in FIGS. 2 and 3. Alternatively, the prism 10 may be substituted by a half-transparent mirror.

Figure 4:
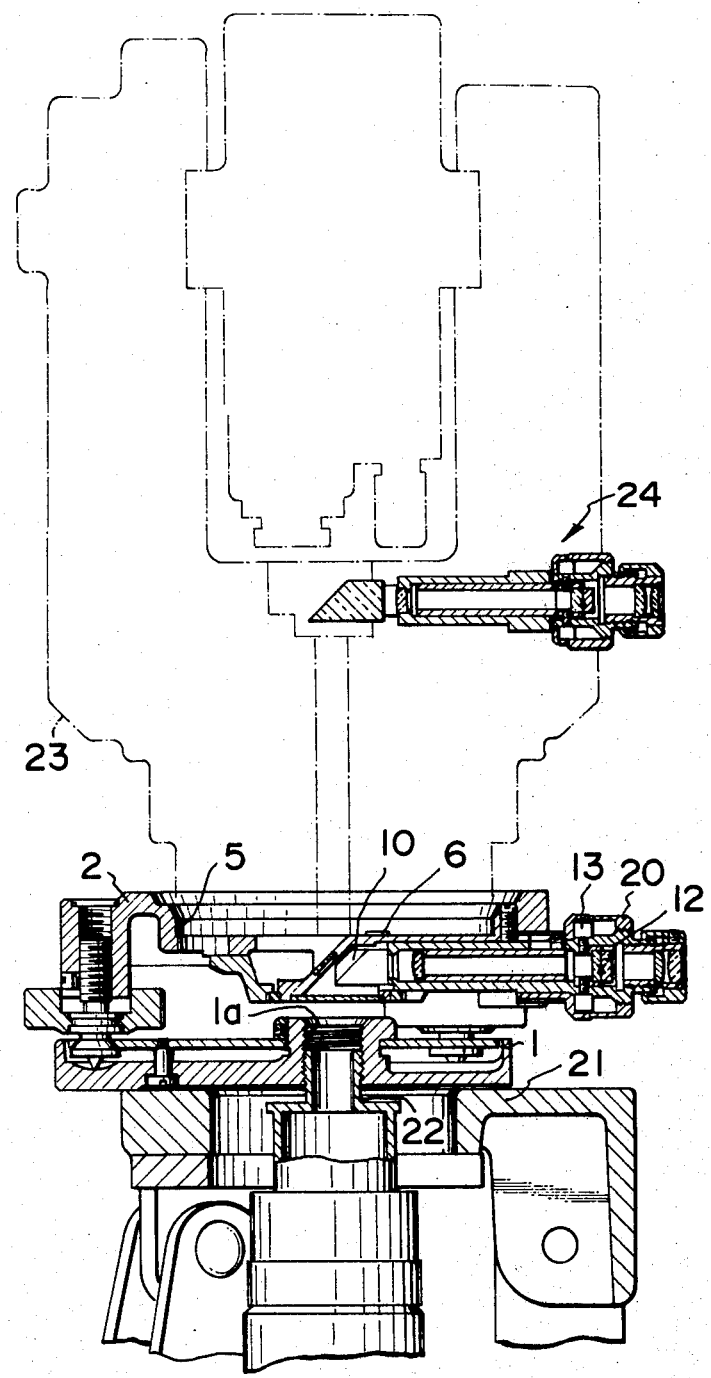

Referring now to FIG. 4, the base board device is shown as being mounted on a tripod and having a transit 23 attached thereto. The tripod has a base 21 which is provided at the center thereof with a hollow externally threaded shaft 22 adapted to be engaged with the threaded hole 1a of the lower board for mounting the base board device on the tripod. The transit 23 is mounted on the base board device at an accurate position by engaging the cylindrical lower portion thereof with the recess 5 in the upper board 2. Normally, the reference plane 6 is adjusted in a horizontal position by means of a leveling device which is provided on the transit.

The transit 23 is provided with a centering telescope 24 which may be of a conventional construction. In the centering telescope 7 provided on the upper board 2 of the base board device the reflecting prism 10 is cut-off at the tip end thereof as previously described so that it is possible to establish a view through the centering telescope 24 in the transit 23 and through the aperture 2a in the upper board 2 and the threaded hole 1a in the lower board 1. Since the body of the transit 23 is rotatable in a horizontal plane, it is possible to determine in an accurate manner a vertically downward point on the ground by making observations through the centering telescope 24 at four 90° different positions of the telescope. The vertically downward point thus determined is then observed by the centering telescope 7 on the upper board 2 and, whenever the mark on the plate 12 is not in line with the aforementioned point on the ground, the cover 20 is removed and the screws 13 are actuated for adjustment.

After the centering telescope 7 has thus been checked and readjusted as necessary, the base board device is carried to a desired position and associated with any desired measuring instrument or other element to perform a desired measurement.

The invention has thus been shown and described with reference to a specific embodiment, however, it should be noted that the invention is in no way limited to the details of the illustrated structures but changes and modifications may be made without departing from the scope of the appended claims.

We claim:

1. A combination of a measuring instrument having a first centering telescope and a base board device for mounting the measuring instrument, said measuring instrument having a body rotatable about an axis perpendicular to the base board, said base board device comprising a base board having a center, a second centering telescope having a viewing axis directed substantially toward the center of the base board, means for removably mounting a measuring instrument at a predetermined position, reflector means provided substantially at the center of the base board for refelecting the viewing axis of the second centering telescope perpendicularly downwardly with respect to the base board, aperture means formed in said base board at the center thereof, said reflector means being such that it permits observing a vertically downward position of said center of the base board through said first centering telescope and said aperture means.

2. A device in accordance with claim 1 in which said reflector means is located at only one side with respect to the center of the base board so as to allow a downward view through the aperture means at the other side of the center of the base board.

3. A device in accordance with claim 1 in which said reflector means has at least one reflecting surface which terminates at a vertical plane passing through the center of the base board and perpendicular to the viewing axis of the centering telescope.

4. A device in accordance with claim 1 in which said reflector means is of a roof prism reflector having a pair of intersecting reflecting surfaces which terminate at a vertical plane passing through the center of the base board and perpendicular to the viewing axis of the centering telescope.

5. A base board for removably supporting, one at a time, a plurality of measuring instruments thereon, one of said measuring instruments being rotatable about a vertical axis and having a first centering telescope for viewing vertically downwards along said vertical axis;

said base board having a central aperture with a reflector means in alignment with said aperture and means for removably mounting a measuring instrument on said board with its vertical axis in alignment with said central aperture;

a second centering telescope on said base board having a viewing axis directed toward said reflector means and means for adjusting the viewing axis of said second telescope in relation to said base board;

said reflector means being such as to permit observing a particular vertically downward position through either the first or the second centering telescopes so that a measuring instrument may be rotated about its vertical axis for a plurality of vertical downward viewings through the first telescope and the adjusting means of the second telescope may then be adjusted so that the second telescope views the same particular vertically downward position so that the base board and its centering telescope may then be accurately used with other measuring instruments without first using that measuring instrument for vertical centering.

* * * * *